United States Patent Office 3,629,372
Patented Dec. 21, 1971

3,629,372
STABILIZATION OF RADIAL TELEBLOCK
COPOLYMERS
William O. Drake, Bartlesville, Okla., assignor to
Phillips Petroleum Company
No Drawing. Filed Sept. 10, 1969, Ser. No. 856,827
Int. Cl. C08f 15/04
U.S. Cl. 260—880    8 Claims

ABSTRACT OF THE DISCLOSURE

Radial block copolymers of butadiene and styrene are rendered stable against degradation by the addition thereto of a stabilizer system which comprises (a) a hindered phenol (b) a substituted aromatic secondary amine (c) an organic phosphite and optionally (d) a thiodipropionate.

---

This invention relates to the protection of radial block copolymers of butadiene and styrene and particularly against deterioration during processing.

BACKGROUND OF THE INVENTION

Radial block copolymers of butadiene and styrene are known and are useful for a variety of purposes. However, for some applications it is desirable that the polymeric material be rendered stable against deterioration. While it is known to add a variety of types of stabilizers to various types of polymers to protect same against deterioration, there is no known universal system which will provide the desired stabilization. Thus, each polymeric composition with its particular properties presents a unique stabilization problem.

THE INVENTION

It is thus an object of the present invention to provide a stable radial block copolymer composition.

Another object of this invention is to provide a method for stabilizing radial block copolymers against deterioration.

Other aspects, objects and the several advantages of this invention will be apparent from the following specification and claims.

In accordance with this invention, I have discovered that incorporation of a stabilizing system consisting essentially of (a) a sterically hindered phenol (b) a substituted aromatic secondary amine and (c) an organic phosphite into radial block copolymers of butadiene and styrene results in a novel composition having improved resistance to degradation as evidenced by its stability against changes in molecular weight.

In a further aspect of this invention I have discovered that in addition to the stabilization system of (a) (b) and (c) there can be optionally added (d) a thiodipropionate which serves to further improve the stability of the composition as demonstrated by its melt flow stability.

It is highly desirable to have polymer compositions which are stable during processing, as indicated by high melt flow retention, and also possess long term stability toward oxidative degradation as indicated by a high differential thermal analyses (DTA) exotherm. Since it is frequently found that additives which improve one of these properties causes a degradation in the other, it is necessary to evaluate the effect of additives on both properties. The most useful additives will obviously be those which provide a composition with the best balances of these properties.

As used herein the term "a sterically hindered phenol" is intended to include a phenol or alkylene bisphenol of the formula:

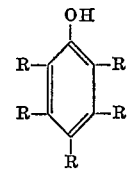

Wherein R is H or an alkyl radical having from 1–20 C atoms, provided that at least one R ortho to the OH— being an alkyl or substituted alkylene (shown below) group, and where, additionally one R may be a radial of the formula:

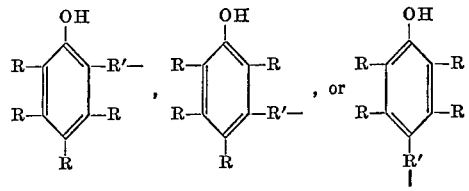

Wherein R' is an alkylene radical having from 1–3 carbon atoms in the chain and from 1 to 8 carbon atoms in the radical and R is as defined above. Examples of these phenols are:

2-methylphenol
2,6-ditert.-butyl-4-methylphenol
2-methyl-6-isopropylphenol
2-tert.-butyl-4-methylphenol
2-amylphenol
2-nonylphenol
2-dodecylphenol
2-tetradecylphenol
methylenebis-2(2,6-ditert.-butyl)phenol
[2,2-bis(2-hydroxyphenyl)]propane
2-eicosylphenol
2,4,6-trieicosylphenol
1,3-bis(2-hydroxyphenyl)-2-methyl-2-t-butylpropane and mixtures of these phenols.

The term "a substituted aromatic secondary amine" as used herein is intended to include those compounds having the general formula:

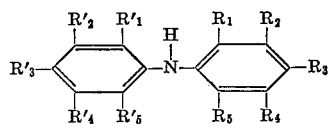

in which at least 2 positions of each of $R_1$–$R_5$ and $R'_1$–$R'_5$ are alkyl or cycloalkyl radicals having from 1–8 carbon atoms therein, the remaining positions being hydrogen. The total number of carbon atoms in the compound should not exceed about 50. The substituents may be the same or different. Suitable examples include:

bis(3,5-dioctylphenyl)amine
bis(2,3-ditertbutylphenyl)amine
(2,4-dimethylphenyl)(2,3-diisopropylphenyl)amine
bis(2,4-dicyclohexylphenyl)amine
bis(pentamethylphenyl)amine
dimesitylamine (2,6-diethylphenyl)(3,5-dimethylphenyl)amine
bis(2,5-dihexyphenyl)amine
bis(2,4,6-tripenty-3-t-butylphenyl)amine
bis(2-butyl-4-pentadecylphenyl)amine
bis[3,4-di(3-methylcyclohexyl)phenyl]amine
bis[3-ethyl-5-(2-cyclopentylethyl)phenyl]amine and mixtures of these amines.

The term "an organic phosphite" as used herein is intended to include organic phosphites having the general formula $(RO)_3 P$ wherein R is an alkyl, aryl, cycloalkyl, or combinations thereof such as aralkyl and alkaryl group, the radicals containing 1–15 carbon atoms. Suitable examples include:

tri(nonylphenyl) phosphite
diphenyl decyl phosphite
didecyl phenyl phosphite
phenyl di(2-ethylhexyl) phosphite
diisooctyl phenyl phosphite
methyl diphenyl phosphite
triphenyl phosphite
tri(2,4-dimethylphenyl) phosphite
phenyl dicyclohexyl phosphite
trimethyl phosphite
diisopropyl phenyl phosphite
triethyl phosphite
di(2-ethylcyclohexyl) n-butyl phosphite
3-cyclopentylpropyl dihexyl phosphite
2-phenylnonyl amyl dodecyl phosphite and mixtures of the above.

The term "thiodipropionate" as used herein is intended to include thiodipropionic acid esters having the general formula:

$$ROOCCH_2CH_2—S—CH_2CH_2COOR'$$

in which R and R' are radicals such as alkyl, cycloalkyl, and aralkyl radicals containing 10–24 carbon atoms. R and R' may be the same or different. Suitable examples are:

didecyl thiodipropionate
dilauryl thiodipropionate
distearyl thiodipripionate
lauryl stearyl thiodipropionate
di(2-n-hexylcycohexyl) thiodipropionate
dicyclododecyl thiodipropionate
di(phenyloctadecyl) thiodipropionate
decyl octadecyl thiodipropionate
dimyristyl thiodipropionate or mixtures of such thiodipropionic acid esters.

In forming the compositions of this invention there is added to the radial block copolymer from about 1.5 to 5.0 parts by weight per 100 parts polymer, preferably 2.0 to 3.5, of the stabilizer system formed by admixing (a) about 0.05 to 1.0 parts by weight per hundred parts of polymer (php.) of a sterically hindered phenol (b) about 0.05 to 1.0 parts by weight (php.) of substituted aromatic amine (c) about 0.5 to 2.0 parts by weight (php.) of an organic phosphite and when optionally employed (d) from about 0.05 to 1.0 php. of a thiodipropionate.

The components of the stabilizer system can be mixed prior to addition to the polymer, or the components can be added individually directly to the polymer in any conventional manner using conventional mixing devices such as a roll mill, plastograph or the like.

The radical block polymers consist of blocks formed by homopolymerization of butadiene; copolymerization of a mixture of butadiene and styrene containing not more than 25 wt. percent styrene; homopolymerization of styrene; and copolymerization of a mixture of styrene and butadiene containing not more than 25 wt. percent butadiene. Polymers of this type can be formed by well known methods using suitable initiators and for example by adding the monomers or mixtures of monomers to such initiators in suitable increments. The segments comprising two or more blocks can then be coupled by well known methods and reagents to form the radial block polymers. Each segment in the radial block polymer will contain at least one block in which butadiene is the major component and at least one block in which styrene is the major component.

These radial block copolymers of butadiene and styrene which are stabilized in accordance with this invention are well known polymers. They can be formed for example by the copolymerization of butadiene and styrene with a lithium initiator followed by treatment with a polyfunctional coupling agent as described in U.S. Pat. No. 3,281,383 of Zelinski et al. Other known methods are also applicable, of course.

Such radial block copolymers which are stabilized in accordance with the present invention generally have a butadiene-styrene weight ratio in the range of 30:70 to 85:15 in the total polymer. A preferred copolymer for purposes of the instant invention are those having a weight ratio in the range of 60:40 to 70:30 of butadiene to styrene.

The stabilized composition can be worked into the desired shape, such as by milling, calendering, extrusion or injection molding. In such operations it will be found to have a considerably improved resistance to reduction in melt flow during the heating.

It is to be understood that the radial block copolymer compositions of the invention can contain in addition to the stabilizer system other additives such as fillers, extenders, dyes, vulcanizing agents and accelerators, and the like.

The following examples are presented to further illustrate the invention.

EXAMPLE I

A series of stabilized copolymer compositions were prepared by addition to a 60/40 (weight ratio) butadiene-styrene radial block copolymer with the stabilizing system as shown in Table I. Mixing was achieved on a Brabender Plastograph at 160° F. under nitrogen at 50 to 60 r.p.m.

The 60/40 (weight ratio) butadiene-styrene radial block copolymer was prepared by the method described in Example IV, Run 3 (treated) in U.S. Pat. 3,281,383, using cyclohexane as a solvent and an epoxidized linseed oil (Epoxyol 9–5, Swift & Co.) as the coupling agent. The catalyst was n-butyl lithium and 0.05 part of tetrahydrofuran based on total monomer were added.

TABLE I

| Composition No. | Hindered phenol [1] | Amine [2] | Phosphite [3] | Thioester [4] |
|---|---|---|---|---|
| 1 | 0.67 | 0.67 | 0.67 | |
| 2 | 0.50 | 0.50 | 0.50 | 0.50 |
| 3 | 0.40 | 0.40 | 1.0 | 0.20 |
| 4 | 0.60 | 0.60 | 1.50 | 0.30 |

[1] 2,6-ditert-butyl-4-methylphenol.
[2] Bis(3,5-dioctylphenyl)amine.
[3] Tris(nonylphenyl)phosphite.
[4] Dilauryl thiodipropionate.
NOTE.—All quantities given in parts per 100 parts of polymer (php.).

Using ASTM D 1238–57T condition G procedure melt flow (g./10 minutes at 200° C.) was thereafter determined for each composition. The following results were obtained:

TABLE II

| | 200° C. MF (5 kg.) g./10 minutes | | |
|---|---|---|---|
| Composition No. | 5 min. | 10 min. | 30 min. |
| 1 | 7.4 | 6.8 | 5.7 |
| 2 | 7.5 | 7.7 | 6.0 |
| 3 | 7.3 | 6.7 | 4.8 |
| 4 | 7.8 | 7.1 | 5.8 |

Percent melt flow retained for each composition was then calculated (30 min./5 min.). The results are shown in Table III.

In addition to the melt flow stabilization tests, differential thermal analysis data was compiled for each composition by heating under oxidative conditions. The temperature at which the composition underwent oxidative degeneration is set forth on Table III.

TABLE III

| Composition No. | Percent MF retained (30 min./5 min.) | DTA exotherm (° C.) |
|---|---|---|
| 1 | 77 | 198 |
| 2 | 80 | 202 |
| 3 | 66 | 197 |
| 4 | 74 | 205 |

The above data based upon compositions of this invention show a good balance of retention of processability and resistance toward oxidative degeneration.

EXAMPLE II

For purpose of comparison a further series of compositions using the radial block copolymer of Example I and the stabilizer systems as shown in Table IV.

TABLE IV
Php. additive

| Composition | Sterically hindered phenol [1] | Secondary amine [2] | Organo phosphite [3] | Thiodipropionate [4] |
|---|---|---|---|---|
| 5 | 0 | 0 | 0 | 0 |
| 6 | 2.0 | 0 | 0 | 0 |
| 7 | 0 | 2.0 | 0 | 0 |
| 8 | 0 | 0 | 2.0 | 0 |
| 9 | 0 | 0 | 0 | 2.0 |
| 10 | 1.0 | 1.0 | 0 | 0 |
| 11 | 0 | 1.0 | 1.0 | 0 |
| 12 | 0 | 0 | 1.0 | 1.0 |
| 13 | 1.0 | 0 | 0 | 1.0 |
| 14 | 0 | 1.0 | 0 | 1.0 |
| 15 | 1.0 | 0 | 1.0 | 0 |
| 16 | 0 | 0.67 | 0.67 | 0.67 |
| 17 | 0.67 | 0 | 0.67 | 0.67 |
| 18 | 0.25 | 0.25 | 0.25 | 0.25 |
| 19 | 0.20 | 0.20 | 0.50 | 0.10 |

[1] 2,6-ditert-butyl-4-methylphenol.
[2] bis(3,5-dioctylphenyl)amine.
[3] tris(nonylphenyl) phosphite.
[4] dilauryl thiodipropionate.
NOTE.—All quantities given in parts per 100 parts of polymer (php.)

Using the procedure as employed in Example I melt flow was thereafter determined. The following results were obtained.

TABLE V

| Composition No. | 200° C: MF (5 kg.) g./10 minutes | | |
|---|---|---|---|
| | 5 min. | 10 min. | 30 min. |
| 5 | | No flow | |
| 6 | 7.9 | 8.4 | 7.9 |
| 7 | | No flow | |
| 8 | 0.5 | 0.1 | No flow. |
| 9 | | No flow | |
| 10 | 7.8 | 8.2 | 8.3 |
| 11 | 1.8 | 0.6 | 0.1 |
| 12 | 0.9 | 0.1 | No flow. |
| 13 | 7.6 | 7.3 | 5.8 |
| 14 | 0.2 | No flow | |
| 15 | 7.0 | 6.9 | 5.6 |
| 16 | 0.1 | No flow | |
| 17 | 8.0 | 6.0 | 5.3 |
| 18 | 6.9 | 5.5 | 4.0 |
| 19 | 6.4 | 5.0 | 3.4 |

Using a procedure identical with that employed in Example I percent melt flow retained and DTA exotherm was determined for each composition. The following results were obtained:

TABLE VI

| Composition No. | Percent MF retained (30 min./5 min.) | DTA exotherm (° C.) |
|---|---|---|
| 5 | Not effective | 149 |
| 6 | 100 | 177 |
| 7 | Not effective | 162 |
| 8 | do | 159 |
| 9 | do | 171 |
| 10 | 106 | 196 |
| 11 | 33 | 177 |
| 12 | Not effective | 176 |
| 13 | 76 | 178 |
| 14 | Not effective | 205 |
| 15 | 80 | 184 |
| 16 | Not effective | 200 |
| 17 | 66 | 185 |
| 18 | 58 | 190 |
| 19 | 53 | 192 |

The most desirable compositions are those that give a balance between melt flow retention and highest DTA Exotherm. The melt flow retention is a relative measure of processability, while the DTA Exotherm is a relative measure of the polymer composition long-term stability toward oxidative degradation.

Comparison of the data obtained in Examples I and II indicates that the stabilizer system of this invention (compositions 1–4) provides relatively high DTA values—197 to 205—which indicates good long-term stability toward oxidative degradation. At the same time there was achieved relatively high values for percent melt flow retention which indicates the outstanding processability of the polymer composition.

The remainder of the compositions (5–19) were controls in which there was either none or 1, 2 or 3 components. The data shows the 1-component and 2-component systems to be relatively ineffective. Composition 15 while having a reasonable flow retention was low on the DTA Exotherm. Composition 16 which was a 3-component control system showed no flow on the melt flow retention and is thus obviously unacceptable. Compositions 18 and 19 serves to show systems outside of the ranges of the invention are not suitable due to insufficient melt flow retention.

In the above Examples I and II, the stabilizing effect of the stabilizer systems of the invention was evaluated in accordance with the following test procedures:

Melt flow—

Test A.S.T.M. D1238–57T Condition G using a 6–8 gram sample, 5 kg. weight at 200° C.

DTA (differential thermal analyzer)—

A measure of long-term stability toward oxidative degradation is obtained utilizing a 10 mg. sample in the Du Pont Model 900 DTA. The temperature is increased at a rate of 10° C./min. in oxygen at 10 s.c.f./hr. The higher the temperature at which rapid oxygen up-take rate starts, the better the long-term stability.

Reasonable variations and modifications of the invention can be made, as followed, in view of the foregoing disclosure, without departing from the spirit or scope thereof.

I claim:

1. A stabilized polymeric composition which comprises a butadiene-styrene radial block copolymer having a butadiene-styrene weight ratio in the range of 30:70 to 85:15 in the total polymer and having incorporated therein from about 1.5 to 5.0 php. of a stabilizing mixture consisting of (a) a sterically hindered phenol compound of the formula

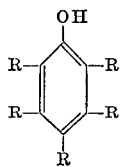

wherein R is hydrogen or an alkyl radical having from 1 to 20 carbon atoms therein or a phenol radical of the formula

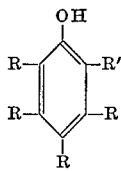 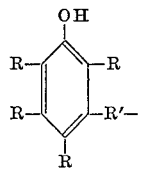 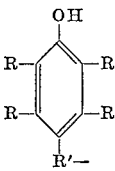

wherein R' is an alkylene radical having from 1 to 3 carbon atoms in the chain and from 1 to 8 carbon atoms in the radical and R is hydrogen or an alkyl radical as above defined, and wherein at least one R ortho to the OH of the phenol compound is an alkyl radical or a phenol radical as above defined;

(b) from about 0.05 to 1.0 php. of a substituted aromatic secondary amine having the formula

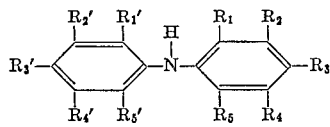

wherein at least two positions of each $R_1$ to $R_5$ and $R'_1$ to $R'_5$ are alkyl or cycloalkyl radicals having from 1 to 8 carbon atoms therein, the remaining positions being hydrogen and the total number of carbon atoms being no more than 50; and (c) from 0.5 to 2.0 php. of an organic phosphite having the formula $(RO)_3P$ wherein R is an alkyl, aryl, or cycloalkyl radical or combination thereof having from 1 to 15 carbon atoms therein.

2. A composition according to claim 1 wherein there is additionally present in said stabilizing system from 0.05 to 1.0 php. of a thiodipropionate of the formula

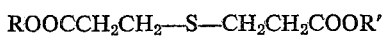

wherein R and R' are the same or different alkyl, cycloalkyl or aralkyl radicals having from 10 to 24 carbon atoms therein.

3. A composition according to claim 1 wherein said sterically hindered phenol is selected from the group consisting of 2-methylphenol,
2,6-ditert.-butyl-4-methylphenol,
2-methyl-6-isopropylphenol,
2-tert.-butyl-4-methylphenol,
2-amylphenol,
2-nonylphenol,
2-dodecylphenol,
2-tetradecyclophenol,
methylenebis-2(2,6-ditert.-butyl)phenol,
[2,2-bis(2-hydroxylphenyl)]propane,
2-eicosylphenol,
2,4,6-trieicosylphenol,
1,3-bis(2-hydroxyphenyl)-2-methyl-2-t-butylpropane and mixtures of these phenols, said substituted aromatic secondary amine is selected from the group consisting of bis(3,5 - dioctylphenyl)amine, bis(2,5-dihexylphenyl) amine and said organic phosphate is selected from the group consisting of tri(nonylphenyl)phosphite,
diphenyl decyl phosphite,
didecyl phenyl phosphite,
phenyl di(2-ethylhexyl) phosphite,
diisooctyl phenyl phosphite,
methyl diphenyl phosphite,
triphenyl phosphite,
tri(2,4-dimethylphenyl) phosphite,
phenyl dicyclohexyl phosphite,
trimethyl phosphite,
diisopropyl phenyl phosphite,
triethyl phosphite,
di(2-ethylcyclohexyl) n-butyl phosphite,
3-cyclopentylpropyl dihexyl phosphite,
2-phenylnonyl amyl dodecyl phosphite, and mixtures of the above.

4. A composition according to claim 2 wherein said thiodipropionate is selected from the group consisting of didecyl thiodipropionate, dilauryl thiodipropionate, distearyl thiodipropionate, lauryl stearyl thiodipropionate, di(2 - n - hexylcyclohexyl) thiodipropionate, dicyclododecyl thiodipropionate, di(phenyloctadecyl) thiopropionate, and decyl octadecyl thiodipropionate.

5. A composition according to claim 1 wherein said hindered phenol is 2,6 - ditert.-butyl - 4 - methylphenol said aromatic secondary amine is bis(3,5 - dioctylphenyl) amine said organic phosphite is tris(nonylphenyl)phosphite.

6. A composition according to claim 2 wherein said thiodipropionate is dilauryl thiodipropionate.

7. A composition according to claim 1 wherein said copolymer is a 60:40 butadiene-styrene radial block copolymer.

8. A composition according to claim 2 wherein said copolymer is a 60:40 butadiene-styrene radial block copolymer.

References Cited
UNITED STATES PATENTS

| | | | |
|---|---|---|---|
| 3,251,905 | 5/1966 | Zelinski | 260—880 B |
| 3,352,820 | 11/1967 | Bawn | 260—880 |
| 3,409,587 | 11/1968 | Mills | 260—45.7 P |
| 3,454,521 | 7/1969 | Tholstrup | 260—45.75 |

HARRY WONG, JR., Primary Examiner

U.S. Cl. X.R.

260— 45.7, 45.9, 45.85, 45.95